(12) United States Patent
Matsuda

(10) Patent No.: US 9,226,334 B2
(45) Date of Patent: Dec. 29, 2015

(54) WIRELESS COMMUNICATION DEVICE, WIRELESS COMMUNICATION SYSTEM, MEMORY MEDIUM STORING METHOD AND COMPUTER PROGRAM

(71) Applicant: SEIKO EPSON CORPORATION, Tokyo (JP)

(72) Inventor: Yoshihide Matsuda, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 146 days.

(21) Appl. No.: 13/853,434

(22) Filed: Mar. 29, 2013

(65) Prior Publication Data

US 2013/0265935 A1 Oct. 10, 2013

(30) Foreign Application Priority Data

Apr. 4, 2012 (JP) ................................ 2012-085790

(51) Int. Cl.
*H04W 76/02* (2009.01)
*H04W 76/06* (2009.01)
*H04L 29/08* (2006.01)
*H04W 4/00* (2009.01)
*H04W 84/12* (2009.01)

(52) U.S. Cl.
CPC .............. *H04W 76/06* (2013.01); *H04L 67/16* (2013.01); *H04W 4/001* (2013.01); *H04W 84/12* (2013.01)

(58) Field of Classification Search
USPC .......................................... 370/331, 437, 334
See application file for complete search history.

(56) References Cited

U.S. PATENT DOCUMENTS

| | | |
|---|---|---|
| 2007/0146782 A1 | 6/2007 | Lehotsky et al. |
| 2008/0170525 A1* | 7/2008 | Geiger .......................... 370/311 |
| 2008/0261525 A1* | 10/2008 | Matsuo et al. ............... 455/41.2 |
| 2010/0219250 A1 | 9/2010 | Wang |
| 2010/0254349 A1* | 10/2010 | Aibara et al. ................. 370/331 |
| 2011/0117907 A1 | 5/2011 | Hooli et al. |
| 2011/0122835 A1 | 5/2011 | Naito et al. |

FOREIGN PATENT DOCUMENTS

| | | |
|---|---|---|
| JP | 2008-219885 A | 9/2008 |
| JP | 2009-260557 A | 11/2009 |

OTHER PUBLICATIONS

The extended European Search Report for European Application No. 13162370.4 mailed Aug. 22, 2013.

* cited by examiner

*Primary Examiner* — Thai Nguyen
(74) *Attorney, Agent, or Firm* — Global IP Counselors, LLP

(57) ABSTRACT

To reduce burden of a user's wireless LAN setting, a wireless communication system includes a first communication device and a second communication device so as to perform a wireless communication with each other. The first communication device includes a determination part that determines whether the wireless communication device connects to a relay station which performs a wireless relay communication, and a communication part that performs a wireless communication in a first connection mode to communicate with the second communication device through the relay station in a case that the relay station is connected, and in a case that the relay station is not connected, the communication part that performs a wireless communication in a second connection mode with the second communication device, which do not communicate through the relay station.

8 Claims, 11 Drawing Sheets

| <Connection Setting Information List> | | | |
|---|---|---|---|
| | SSID (81) | Security Classification (82) | Password (83) |
| 101a | AP-10000 | WPA2-AES | ABCDEFGHIJKLM |
| 101b | AP-20000 | WPA2-TKIP | 1234567890ABC |

Fig. 5

| <PRINTER AP CONNECTION SETTING INFORMATION> | | |
| --- | --- | --- |
| SSID (81) | SECURITY CLASSIFICATION (82) | PASSWORD (83) |
| AP-WFD300 | WPA2-AES | ABCDEFGH12345 |

WIRELESS COMMUNICATION DEVICE, WIRELESS COMMUNICATION SYSTEM, MEMORY MEDIUM STORING METHOD AND COMPUTER PROGRAM

CROSS-REFERENCE TO RELATED APPLICATIONS

This application claims priority to Japanese Patent Application No. 2012-085790 filed on Apr. 4, 2012. The entire disclosure of Japanese Patent Application No. 2012-085790 is hereby incorporated herein by reference.

BACKGROUND

1. Technical Field

The present invention relates to a wireless communication device, a wireless communication system, and a wireless communication method and computer program.

2. Background Technology

In recent years, a wireless LAN (Local Area Network) has become popular at homes and offices so that not only a PC (Personal Computer), but also various devices such as a printer, a scanner, a smartphone, a digital picture frame, and the like are connectable to the wireless LAN. However, a connection setting for the wireless LAN of wireless communication devices is difficult for users who do not know the detail about the wireless LAN. Therefore, various methods to reduce the difficulty of the connection setting of the wireless LAN have been disclosed.

For example, Patent Document 1 discloses an automatic setting method of wireless peripheral devices. In this method, a network apparatus becomes a master and replicates for itself by wirelessly transmitting a setting data to the wireless peripheral devices.

For example, Patent Document 2 discloses that required information for a wireless LAN communication is obtained from other communication apparatuses that have connected to an access point previously.

Japanese Laid-open Patent Publication No. 2008-219885 (Patent Document 1) and Japanese Laid-open Patent Publication No. 2009-260557 (Patent Document 2) are examples of the related art.

SUMMARY

Problems to Be Solved by the Invention

The wireless LAN has a plurality of connection modes such as an infrastructure (hereinafter referred to as "IS") mode, an ad hoc mode, a WiFi Direct (hereinafter referred to as "WFD"), or the like depending on an existence or non-existence of an access point (hereafter referred to as "AP"). However, for example, when it tries to connect to a printer and a PC by the wireless LAN, it is difficult a general user to set an appropriate connection mode for the printer and the PC.

Thus, an advantage of the invention is to provide a wireless communication system, a wireless communication method and computer program that reduces the burden of the user's wireless LAN setting.

An advantage of the invention is to provide a wireless communication device, a wireless communication system, a wireless communication method and computer program that select an appropriate connection mode.

Means Used to Solve the Above-Mentioned Problems

A wireless communication device according to one aspect of the invention is the wireless communication device that performs a wireless communication with other communication devices. It includes a determination part that determines whether the wireless communication device connects to a relay station which performs a wireless relay communication; and a communication part that performs a wireless communication in a first connection mode to communicate with other communication devices through the relay station in a case that the relay station is connected, and in a case that the relay station is not connected, the communication part that performs a wireless communication in a second connection mode with other communication devices, which do not communicate through the relay station.

BRIEF DESCRIPTION OF THE DRAWINGS

Referring now to the attached drawings which form a part of this original disclosure:

FIG. 5 is a table showing an example of data items of connection setting information 101;

FIG. 8 is a table showing an example of data items of printer AP connection setting information 105;

DETAILED DESCRIPTION OF EXEMPLARY EMBODIMENTS

The wireless communication system according to the present embodiment is characterized by selecting an appropriate connection mode from the plurality of connection modes based on the setting information of the wireless communication, and establishing a communication channel with other communication devices. Hereinafter, the first embodiment of the invention will be described with reference to the drawings.

Figure 1:
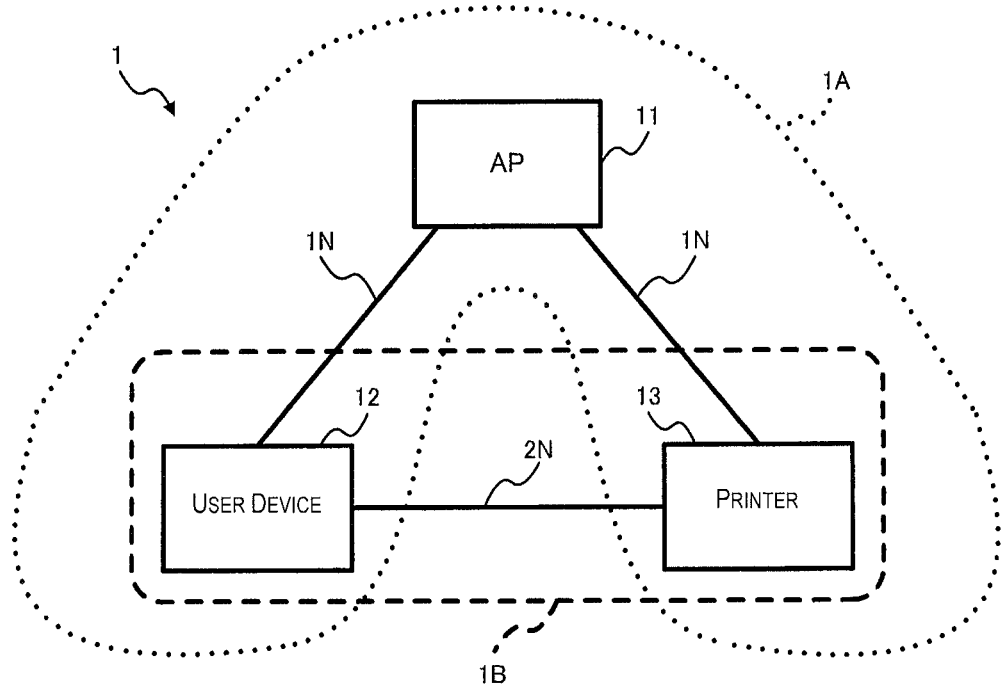
FIG. 1 is a schematic diagram showing an example of a wireless communication system configuration.

FIG. 1 is a schematic diagram showing an example of a wireless communication system configuration. By the way, the present embodiment explains a printer as an example as a communication device and a user device as an example as a wireless communication device, but it can be other communication device. For example, it can be a scanner having a wireless communication function, a compound device, and the like. Also, in the present embodiment, a wireless communication AP 11, a user device 12, and a printer 13 are explained as one device in each, but for example, the AP 11, the user device 12 or the printer 13 can be more than two devices in each.

In FIG. 1, the wireless communication system 1 has the AP 11, the user device 12, and the printer 13. A wireless LAN 1A in the wireless communication system 1 is configured by the AP 11, the user device 12, and the printer 13. A wireless LAN 1B is configured by the user device 12 and the printer 13. That is, the wireless LAN 1B does not exist the AP 11.

The AP 11 functions as a relay station of the wireless communication. For example, the AP 11 intermediates transmitting and receiving data with a wireless communication between the user device 12 and the printer 13. For example, the AP11 is a cordless handset, and the like of a wireless LAN router itself (base unit), or the wireless LAN router (base unit). The AP11 can establish the wireless LAN by the IS mode which is one of the connection modes. For example, when the user device 12 and the printer 13 were connected to the AP 11 in the IS mode (connection 1N in FIG. 1), the wireless LAN 1A including the AP 11, the user device 12, and the printer 13 is established.

The user device 12 performs transmitting and receiving data by the wireless communication with other communication devices such as the printer 13, and the like. The user device 12 is, for example, a PC (Personal Computer), a smartphone, a mobile phone, a mobile type computer, a game device, or the like. The user device 12 establishes an environment for a possible wireless communication with the printer 13 instructed by the user or in accordance with a predetermined setting. The user device 12 corresponds to at least the IS mode so that it can connect to the AP 11. More specifically, when the printer 13 operates in the WFD mode which is one of the connection modes, and provides the AP (hereinafter referred to as "printer AP") of the printer 13 itself, the user device 12 can connect to the printer AP. By the way, when the user device 12 is in response to the WFD mode, it can connect with the printer 13 in the WFD mode. The hardware configuration of the user device 12 and the user device 12 having various functions will be described later.

The printer 13 is equipped with a wireless communication function and performs transmitting and receiving data by a wireless communication with other communication devices such as the user device 12, and the like. Specifically, the printer 13 executes printing based on the data which was sent wirelessly from the user device 12, and various status information of the printer 13 are transmitted to the user device 12. The printer 13 corresponds to the IS mode and the WFD mode so that an environment for a possible wireless communication with the user device 12 is established in an appropriate connection mode corresponding to a condition. For example, when the user device 12 is directly connected to the printer AP (connection 2N in FIG. 1), the wireless LAN 1B including the printer 13 and the user device 12 is established. The hardware configuration of the printer 13 and the printer 13 having various functions will be described later.

Figure 2:
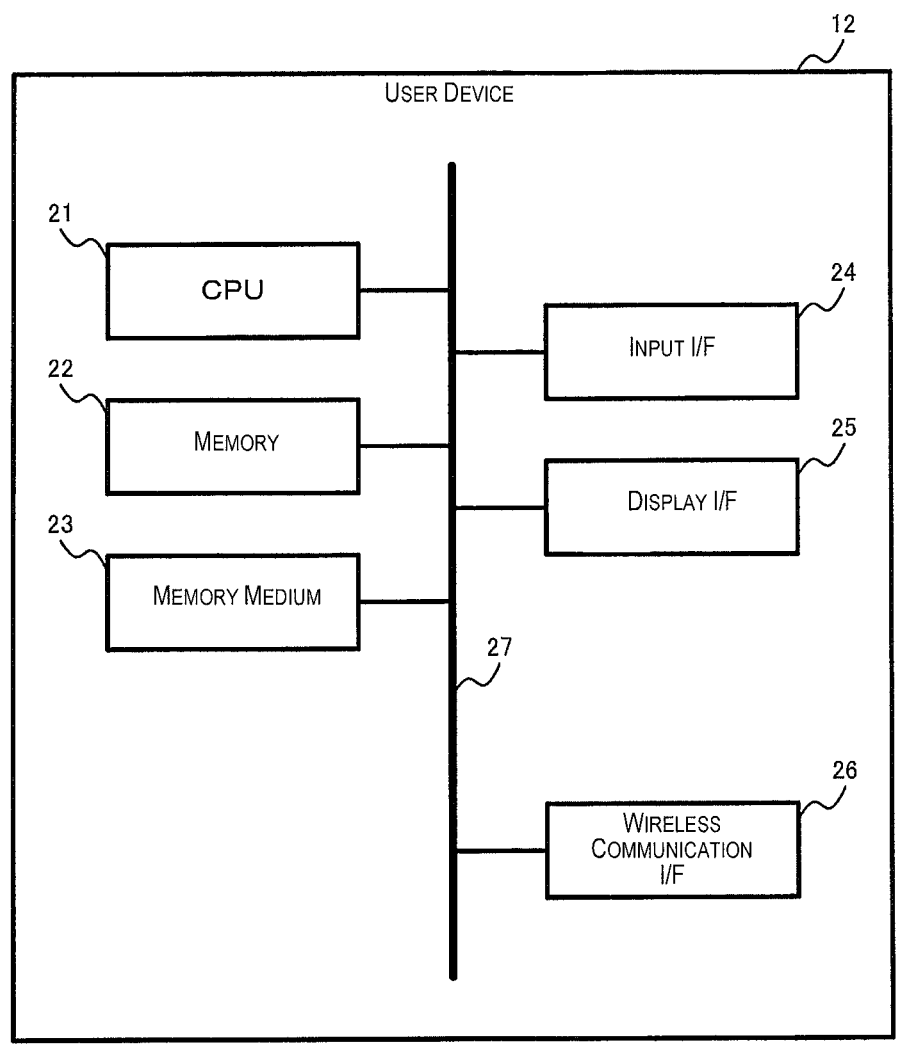
FIG. 2 is a block diagram showing a hardware configuration of a user device 12.

FIG. 2 is a block diagram showing an example of the hardware configuration of the user device 12. The user device 12 has a CPU 21, a memory 22, a memory medium 23, an input interface (hereafter referred to as "I/F") 24, an output I/F 25, and a wireless communication I/F 26. These parts 21 to 26 are connected by a bus 27 which is possible for a data communication, reciprocally.

The CPU 21 reads the computer program (hereinafter referred to as "program") from the memory medium 23, and various functions of the user device 12, which will be described, are realized by executing a process including the program.

The memory 22 temporary stores required data during execution of the program. The memory 22 is configured by, for example, the Dynamic Random Access Memory (DRAM), and the like. By the way, the CPU 21 and the memory 22 can be configured separately, or it can be configured as a single.

The memory medium 23 stores the program, the data used for the program, and the like. The memory medium 23 is configured by, for example, Hard Disk Drive (HDD) or a flash memory.

The input I/F 24 accepts various input information from the user and transfers the input information to the program so as to execute the CPU21. For example, the input I/F 24 is configured by a keyboard, a mouse, button, and/or a touch-sensor, and the like.

The output I/F 25 produces various output information of program, which is executed by the CPU 21, in the user's recognizable form. For example, the output I/F 25 is configured by a display, a speaker, and/or a LED, and the like.

The wireless communication I/F 26 controls a wireless signal and realizes wireless data communication with other communication devices (e.g., AP11 or printer 13). The wireless communication I/F 26 is controlled with reference to, for example, IEEE802.11. Also, in the wireless communication I/F 26, the communication data can be encrypted and decoded.

Figure 3:
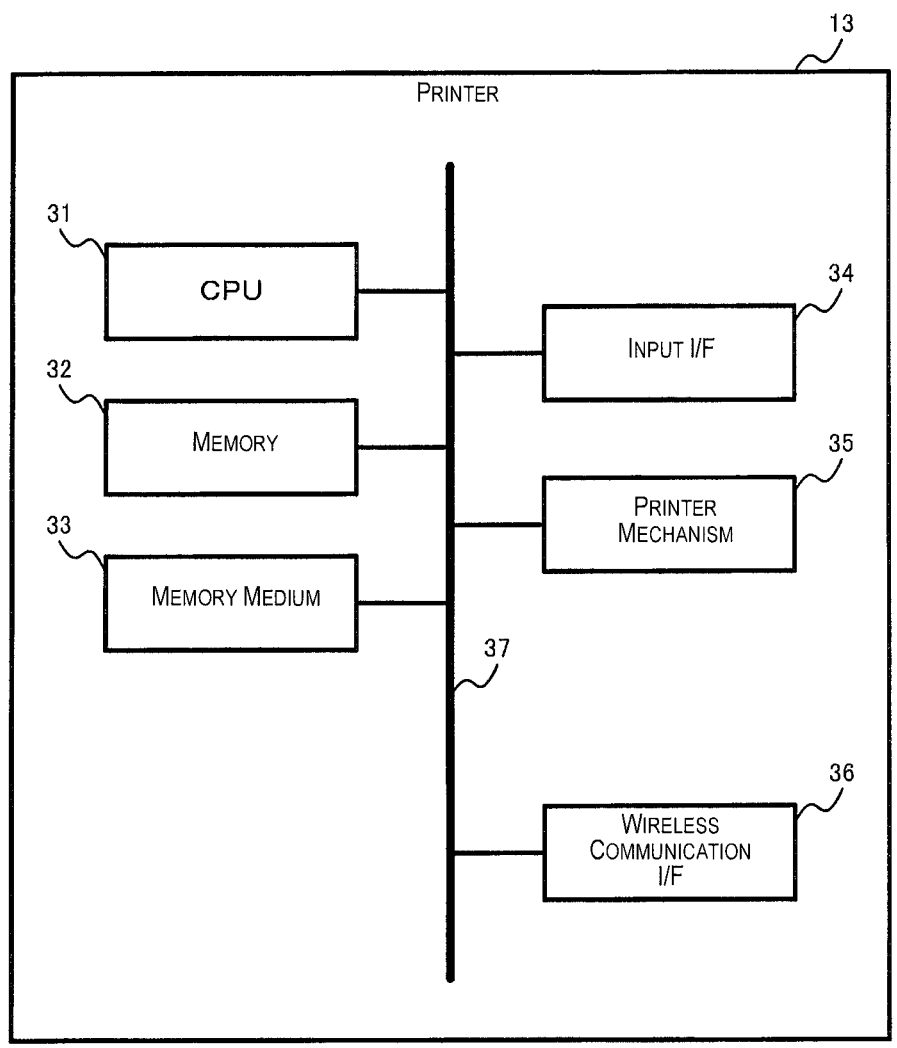
FIG. 3 is a block diagram showing an example of a hardware configuration of a printer 13.

FIG. 3 is a block diagram showing an example of a hardware configuration of a printer 13. The printer 13 has a CPU 31, a memory 32, a memory medium 33, an input I/F 34, a printing mechanism 35, and a wireless communication I/F 36. These elements 31 to 36 are connected by a bus 37 that is possible for a bidirectional data communication.

The CPU 31 reads program from the memory medium 33 and realizes various functions of the printer 13, which will be described later, by executing the process included in the program.

The memory 32 temporary stores the data, which is required during the execution of the program. By the way, the CPU 31 and the memory 32 can be configured as separate or can be configured as one.

The memory medium 33 stores program and the data used for the program. The memory medium 33 is configured by, for example, the Electrically Erasable and Programmable Read-only Memory (EEPROM), a flash memory, or the like.

The input I/F 34 accepts various input information from the user and transfers the input information to the program, which is executed in the CPU 31. The input I/F 34 is configured by a button and/or a touch panel, and the like.

The printing mechanism 35 has various mechanisms (e.g., a paper feeding mechanism, an ink output mechanism, and the like) to print a predetermined image to an object. The printing mechanism 35 is controlled by, for example, the program which is executed in the CPU 31.

The wireless communication I/F 36 controls a wireless communication and realizes a wireless data communication with other communication devices (e.g., the AP11 or the user device 12). The wireless communication I/F 36 is controlled with reference to, for example, the IEEE802.11. Also, in the wireless communication I/F 36, the communication data can be encrypted and decoded.

Figure 4:
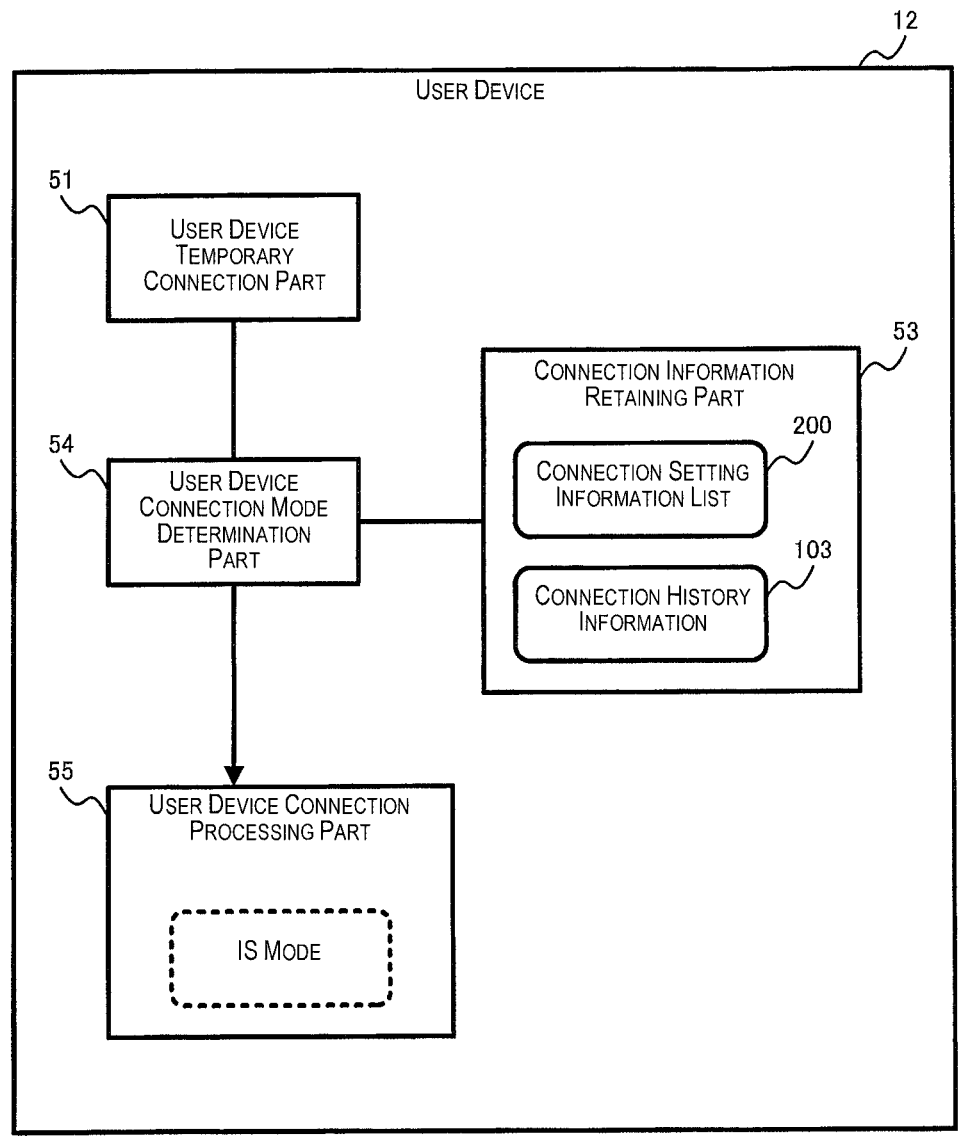
FIG. 4 is a block diagram showing an example of a functional configuration of the user device 12.

FIG. 4 is a block diagram showing an example of a functional configuration of the user device 12. The respective functions 51, 53 to 55 are realized by executing the predetermined program in the CPU 21 so as to control the respective elements 22 to 26. The user device 12 has an user device temporary connection part 51, a connection information retaining part 53, an user device connection mode determination part 54, and an user device communication processing part 55.

The user device temporary connection part 51 temporarily forms a temporary wireless communication channel (hereafter referred to as "temporary communication channel") so that the user device 21 and the printer 13 can directly transfer and receive data (peer-to-peer). Hereinafter, there is a case that the connection between the user device 12 and the printer 13 by the temporary communication channel can be called as "temporary connection". To form the temporary communication channel, the user device temporary connection part 51 turns off the official communication channel (e.g., communication channel with AP11) that has been connected until then. And, the user device temporary connection part 51 searches the printer 13 so as to form a temporary connection channel with the printer that was found. At this point, the user device temporary connection part 51 forms a temporary connection channel with the printer 13 if only one printer 13 was found, and if a plurality of printers 13 were found, the process can be determined as an error. The user device 12 transfers and receives the data, which is required for the connection with the printer 13, with the printer 13 through this temporary connection channel. The temporary connection channel can be formed by an ad-hoc mode, which is one of the connection modes, or the temporary connection channel can be formed by an independent method.

The connection information retaining part 53 retains connection setting information 101, which is the required information when the user device 12 and the AP 11 are connected, and connection history information 103, which is the record when the user device 12 and the AP 11 were connected. The connection information retaining part 53 can retain a plurality of connection setting information 101 as a whole in a connection setting information list 200. Hereinafter, the details about the connection setting information 101 and the connection history information 103 will be described.

FIG. 5 is a table showing an example of data items of the connection setting information 101. The connection setting information 101 has a Service Set Identifier (SSID) 81, a security classification 82, and a password 83.

The SSID 81 is the ID to uniquely identify the AP 11. The security classification 82 is the classification of an identification method and an encryption method corresponding to the AP 11 related to the SSID 81. For example, the connection setting information 101a in the first record of the connection setting information list 200 in FIG. 5 shows that the SSID 81 is "AP-10000", the security classification 82 is "WPA2-AES", and the password 83 is "ABCDEFGHIJKLM". That is, the user device 12 can connect to the AP 11 in which the SSID 81 is "AP-10000" by using the connection setting information 101.

As shown in FIG. 5, if the plurality of connection setting information 101 is retained in the connection setting information list 200, the user device 12 searches the AP 11 registered in the connection setting list so that it can connect to the AP 11 which was found.

If none of the connection setting information 101 is retained in the connection setting information list 200 (that is, when the connection setting information list 200 is empty), the user device 12 cannot connect to any of AP 11. For example, when the user does not use the wireless function of the user device 12 at all, it makes in this condition.

Figure 6:
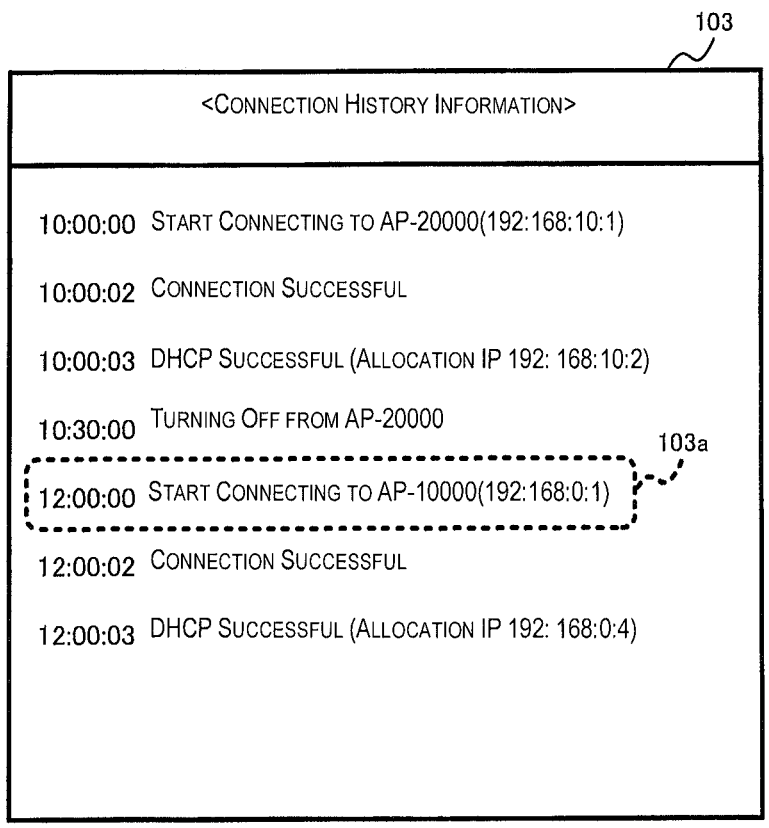
FIG. 6 is a schematic diagram showing an example of information included in connection history information 103.

FIG. 6 is a schematic diagram showing an example of information included in connection history information 103. The connection history information 103 records the information related to all of the APs 11 that the user device 12 has connected until now or the AP 11 that the user device 12 is currently connecting. For example, the information such as when and which AP 11 of the SSID 81 was connected, whether or not the connection was successful, what was the IP address of the connected AP11, and the like, is retained in the connection history information 103. The user device connection mode determination part 54, which will describe later, determines whether or not the user device 12 connects to the AP 11 (hereinafter referred to as "connected AP") from the connection history information 103. For example, from the element 103a shown in FIG. 6, it can determine that the SSID 81 of the connected AP 11 is "AP-10000". Hereinafter, it returns to the explanation of FIG. 4.

The user device connection mode determination part 54 determines which connection mode is using to connect between the printer 13 and the user device 12 in response to whether or not it connects to the AP 11. For example, the user device connection mode determination part 54 determines any of the connection modes "IS mode" or "WFD mode" to connect between the printer 13 and the user device 12. The user device connection mode determination part 54 determines the following (1) to (4) based on the connection setting information 101 and the connection history information 103. The detail about the determination process will be explained with reference to FIG. 9 later.

(1) When the connection setting information list 200 does not include any one of the connection setting information 101, the user device connection mode determination part 54 determines that the user device has not been connected so that the connection mode becomes "WFD mode".

(2) When the connection setting information list 200 includes the connection setting information 101 but the connected AP 11 was not identified from the connection history information 103, the user device connection mode determination part 54 determines that the user device has not been connected so that i the connection mode becomes "WFD mode".

(3) When the connection setting information list 200 includes the connection setting information 101 and the connected AP 11 was identified from the connection history information 103 but the connection setting information 101 corresponding to the identified connected AP 11 cannot be identified from the connection setting information list 200, the user device connection mode determination part 54 determines that the user device has not been connected so that the connection mode becomes "WFD mode".

(4) When the connection setting information list 200 includes the connection setting information101, the currently connected AP 11 is identified from the connection history information 103, and the connection setting information 101 corresponding to the identified connected AP 11 is identified from the connection setting information list 200, the user device connection mode determination part 54 determines that the user device has been connected so that the connection mode becomes "IS mode".

The user device connection mode determination part 54 sends a determination result to the printer 13 through the temporary communication channel. When the determination result is the "IS mode", the user device connection mode determination part 54 sends the connection setting information corresponding to the connected AP with the determination result. After that, the user device connection mode determination part 54 turns off the temporary connection with the printer 13.

The user device communication processing part 55 forms an official communication channel with the printer 13 based on the determination result of the user device communication mode determination part 54.

For example, when the user device connection mode determination part 54 determined that it connects to the connected AP 11 in the "IS mode", the user device connection processing part 55 turns off the temporary connection and reconnects to the connected AP 11 in the IS mode. At this point, the printer 13 is also connected to the connected AP 11 in the IS mode so that the user device communication processing part 55 can perform a data communication with the printer 13 through the AP 11.

On the other hand, even when the user device connection mode determination part 54 determined that it does not connect to the connected AP, when the user device is not compatible with the "WFD mode", the user device communication processing part 55 turns off the temporary connection and connects to the printer AP in the "IS mode". At this point, the printer 13 is operating in the WFD mode so that the user communication processing part 55 can directly perform a data communication (peer-to-peer) with the printer 13. By the way, when the user device corresponds to the "WFD mode", the user device communication processing part 55 can connect to the printer 13 in the "WFD mode".

Figure 7:
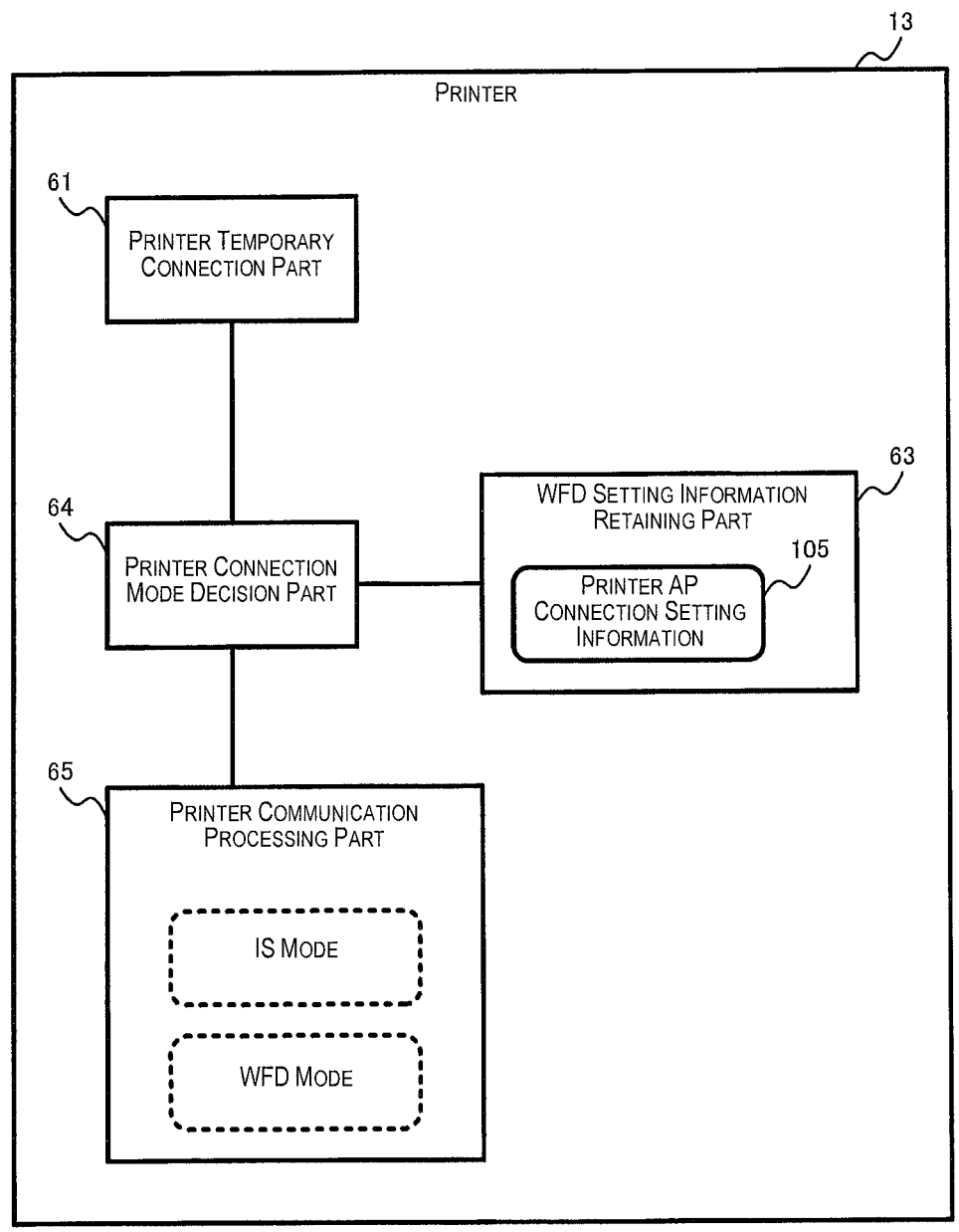
FIG. 7 is a block diagram showing an example of a functional configuration of the printer 13.

FIG. 7 is a block diagram showing an example of a functional configuration of the printer 13. The respective functions 61, 63 to 65 are realized by which the CPU 31 executes the predetermined program so as to control the respective elements 32 to 36. The printer 13 has a printer temporary connection part 61, a WFD setting information retaining part 63, a printer connection mode decision part 64, and a printer communication processing part 65.

The printer temporary connection part 61 temporarily forms a temporary communication channel to directly send and receive data between the user device 12 and the printer 13 (peer-to-peer). In this case, the printer temporary connection part 61 turns off the official communication channel that has been formed until then (e.g., a communication channel with the AP 11 or a communication channel with a different communication device). The printer 13 sends and receives information, which is required for the connection with the user device 12, with the user device 12 through this temporary communication channel. The printer 13 can provide an application or the like, which supports the connection between the user device 12 and the printer 13, through the temporary channel. The temporary communication channel can be formed by the ad-hoc mode that is one of the connection modes, or it can be formed by the independent method.

The WFD setting information retaining part 63 retains the connection setting information (hereafter referred to as "printer AP connection setting information") 105, which is required for other communication devices to connect to the printer AP. By the way, other than the printer AP connection setting information 105, the WFD setting information retaining part 63 retains the setting information, which is required for the connect in the WFD mode. The printer AP connection setting information can be called as direct connection setting information. Next, the detail about the printer AP connection setting information 105 will be described.

FIG. 8 is a table showing an example of data items of the printer AP connection setting information 105. As the data items, the printer AP connection setting information 105 has the SSID 81, the security classification 82, and the password 83. The explanation of these data items 81 to 83 are the same as the above described connection setting information 101 so that it will be omitted.

For example, the printer AP connection setting information 105 in FIG. 8 shows that the SSID 81 is "AP-WFD300", the security classification 82 is "WPA2-AES", and the password 83 is "ABCDEFGHI12345". That is, the communication device in which the SSID 81, the security classification 82 and the password 83 are set can connect to the printer AP. Hereinafter, it returns to the explanation of FIG. 7.

The printer connection mode decision part 64 decides own connection mode based on the determination result of the connection mode received from the user device 12 through the temporary communication channel. That is, when the determination result is the "IS mode", the printer connection mode decision part 64 itself also determines to be connected in the "IS mode", and when the determination result is the "WFD mode", the printer connection mode decision part 64 itself also determines to be connected in the "WFD mode".

When connecting in the "IS mode" was decided, the printer connection mode decision part 64 instructs the printer communication processing part 65, which will describe later, to connect to the connected AP 11 in the IS mode based on the connection setting information 101 of the connected AP 11 sent with the information of the connection mode received from the user device 12.

When connecting in the "WFD mode" was determined, the printer connection mode decision part 64 sends the printer AP connection setting information 1205 to the user device 12. And, the printer connection mode decision part 64 instructs the printer communication processing part 65 to connect in the WFD mode.

The printer communication processing part 65 forms an official communication channel with the user device 12 in response to the connection mode determined by the printer connection mode decision part 64.

For example, if the connection mode decided by the printer connection mode decision part 64 is the "IS mode", first, the printer communication processing part 65 turns off the temporary communication channel. And, the printer communication processing part 65 connects to the connected AP 11 in the "IS mode". At this point, the user device 12 also connects to the AP 11 so that the printer communication processing part can perform a data communication with the user device 12 through the AP 11.

On the other hand, if the connection mode decided by the printer connection mode decision part 64 is the "WFD mode", first, the printer communication processing part 65 turns off the temporary communication channel. And, the printer communication processing part 65 operates the printer AP and waits for the connection from the user device 12. And, when an official connection request is sent to the printer AP from the user device 12, the printer communication processing part 65 accepts the connection to the user device 12. Because of this, the printer communication processing part 65 can perform a data communication with the user device 12 directly. By the way, when the user device 12 is compatible with the WFD mode, the printer communication processing part 65 can connect with the user device 12 in the WFD mode.

Figure 9:
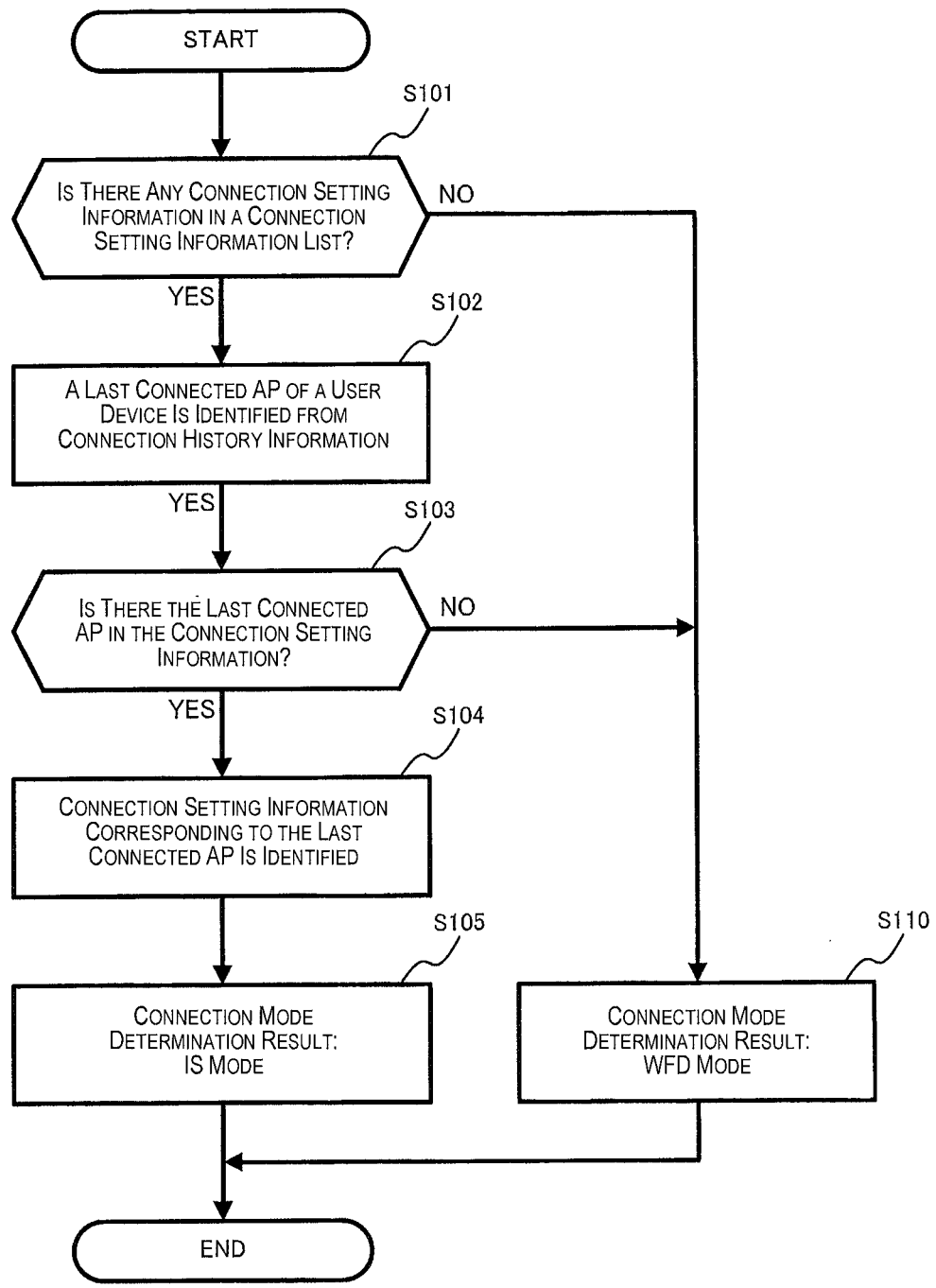
FIG. 9 is a flowchart showing an example of a connection mode determination process.

FIG. 9 is a flowchart showing an example of a connection mode determination process. By the way, the user device connection mode determination part 54 can execute a part of the process shown in the flowchart.

The user device communication mode determination part 54 determines whether or not the connection setting information list 200 includes the connection setting information 101 (S101).

When the connection setting information list 200 does not include any one of the connection setting information 101 (S101: NO), the user device connection mode determination part 54 determines that the AP 11 is not connected, and the connection mode determination result is "WFD mode" (S110) and the process ends (END).

If the connection setting information list 200 includes the connection setting information 101 (S101: YES), the user device connection mode determination part 54 identifies the AP 11 (that is, the connected AP 11) that the user device 12 connects based on the connection history information 103 (S102).

The user device connection mode determination part 54 determines whether or not the connected AP 11 is included in the connection setting list (S103).

When the connected AP 11 is not included in the connection setting information list 200, or when the connected AP 11 was not identified from the connection history information 103 (S103: NO), it is determined that the AP 11 is not connected so that the user device connection mode determination part 54 determines "WFD mode" as a connection mode, and the process ends (END).

When the connected AP 11 is included in the connection setting list (S103: YES), the user device connection mode determination part 54 identifies the connection setting information 101 corresponding to the connected AP 11 (S104). And, the user device connection mode determination part 54 determines that the AP 11 is connected and the connection mode is set as "IS mode" (S105), and the process ends (END).

Figure 10:
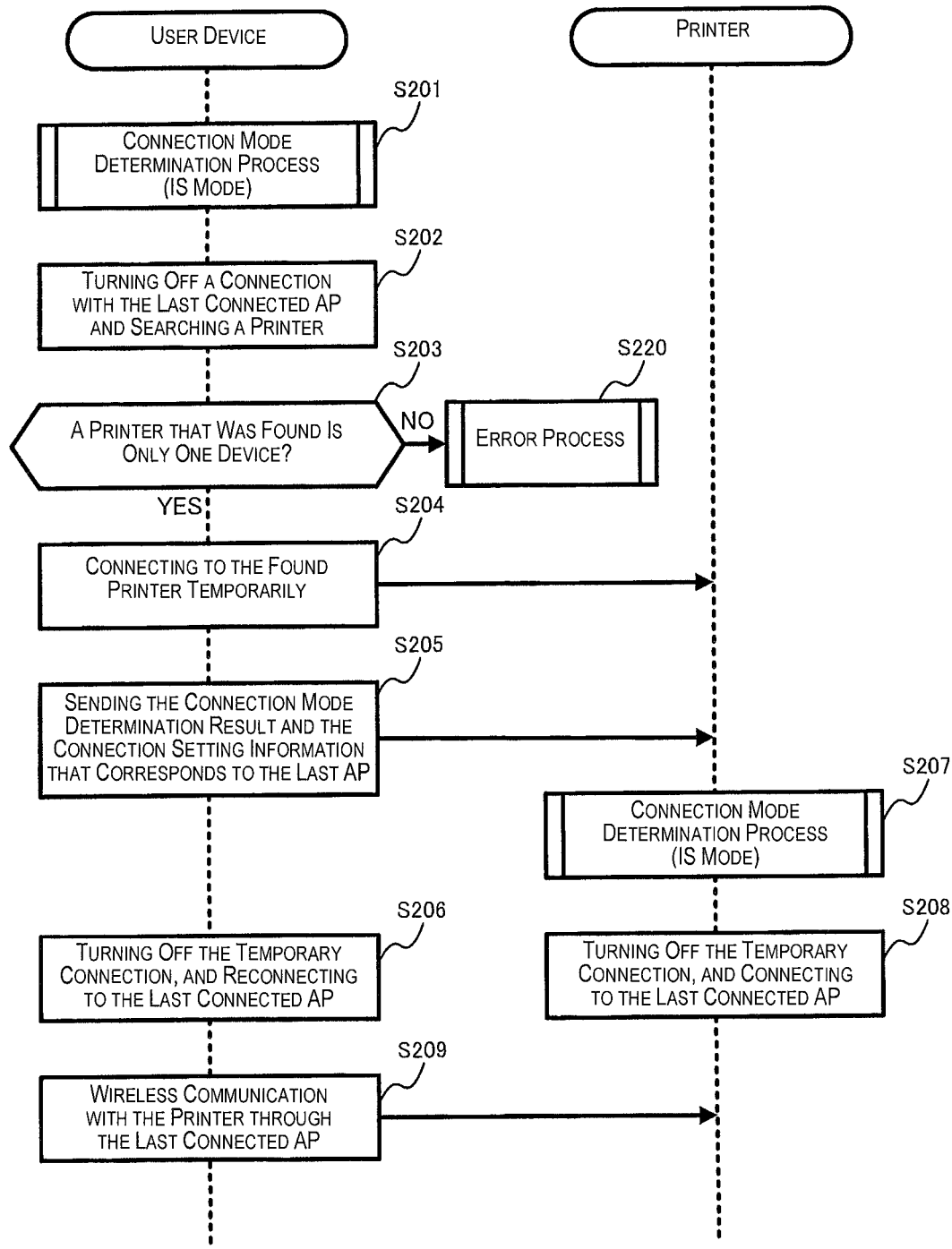
FIG. 10 is a sequence chart showing a wireless connection of the printer 13 when a connection mode determination result is a IS mode.

FIG. 10 is a sequence chart showing a wireless connection of the printer 13 when a connection mode determination result is the IS mode.

The user device connection mode determination part 54 determines that the connection mode determined in the process shown in FIG. 9 is any one of "WFD mode" and "IS mode" (S201). In this case, the connection mode was the "IS mode".

The user device temporary connection part 51 turns off the connection with the AP 11 (that is, the connected AP) which is currently connected, and searches the printer 13 (S202).

The user device temporary part 51 determines whether or not the printer found by the search was only one. When the found printer was 0 or the plural devices (S203: NO), an error process is executed and the process ends.

On the other hand, when the found printer was only one device (S203: YES), the user device temporary connection part 51 temporarily connects to the found printer (S204).

The user device connection mode determination part 54 sends the determination result "IS mode" and the connection setting information 101 of the connected AP 11 to the printer 13 through the temporary communication channel (S205).

The user device communication processing part 55 turns off the temporary connection and reconnects to the connected AP in the IS mode (S206).

On the other hand, the printer connection mode decision part 64 of the printer 13, which received the connection mode determination result "IS mode" and the connection setting information 101 of the connected AP 11 from the user device 12, determines to the "IS mode" as the connection mode (S207).

And, the printer communication processing part 65 turns off the temporary communication channel and connects to the connected AP in the IS mode (S208).

Because of this, a wireless communication is possible between the user device 12 and the printer 13 through the connected AP (S209).

Figure 11:
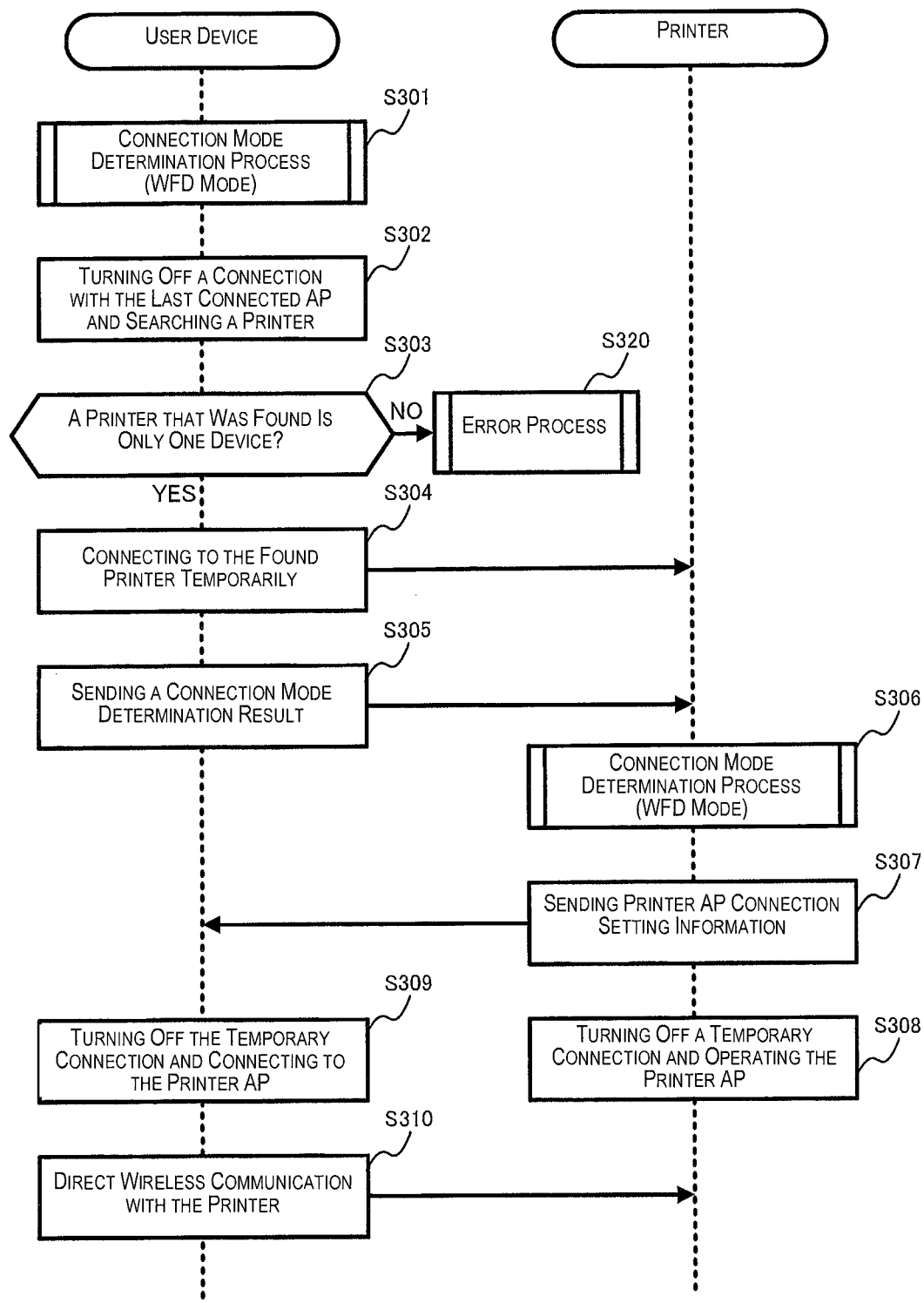
FIG. 11 is a sequence chart showing a wireless connection of the printer 13 when a connection mode determination result is a WFD mode.

FIG. 11 is a sequence chart showing a wireless connection of the printer 13 when a connection mode determination result is the WFD mode.

The user device connection mode determination part 54 determines the connection mode by the process shown in FIG. 9. In this case, the determination result was "WFD mode".

The process of Steps S302 to S304 and S320 is approximately the same as the description of Steps S202 to S204 and S220 with reference to FIG. 10, so that here, the description thereof will be omitted.

The user device connection mode determination part 54 sends the connection mode determination result "WFD mode" to the printer 13 (S305). And, the user device 12 waits for the response from the printer.

The printer connection mode decision part 64 that received the connection mode determination result "WFD mode" decides "WFD mode" as the connection mode of the printer 13 (S306). And, the printer connection mode decision part 64 responds the connection setting information 101 to the user device 12 (S307).

The printer communication processing part 65 turns off the temporary communication channel, operates the printer AP, and waits for the communication request from the user device 12 (S308).

On the other hand, the user device communication processing part 55 of the user device 12 received the response of the printer AP connection setting information 105 from the printer 13 turns off the temporary connection and connects to the printer AP in "IS mode" (S309).

Because of this, the direct wireless communication between the user device 12 and the printer 13, that is, the wireless communication by the peer-to-peer connection without through the AP becomes possible (S310).

For example, the present embodiment provides effects discussed below.

(1) The user device 12 and the printer 13 can be connected in a proper connection mode depending on existence or non-existence of the AP 11.

(2) Even when the AP 11 is not existed, the user can easily perform a wireless communication between the user device 12 and the printer 13.

(3) Without any concern whether or not the user device 12 is connected to the AP 11, or when the plurality of APs 11 is existed, or the like, the user can easily perform a wireless communication between the user device 12 and the printer 13.

The above described embodiments of the invention are an example of the description of the invention, and the scope of the invention is not limited to those embodiments only. One of ordinarily skill in the art can execute the invention in other various aspects without deviating the scope of the invention.

For example, a priority can be set in the connection setting information 101 included in the connection setting information list 200. And, the user device 12 connects to the AP 11 in accordance with the connection setting information 101 that is connectable in the highest priority. And, when the determination result is "IS mode", the connection setting information 101 that is connectable in the highest priority is sent to the printer 13. Because of this, it can be realized in the same manner as the present embodiment without using the connection history information 103.

For example, in the present embodiment, the connection mode determination was performed in the user device 12, but it can be performed in the printer 13 side. In this case, for example, the user device 12 sends the connection setting information list 200 and the connection history information 103 to the printer 13 and the printer 13 executes the process corresponding to FIG. 9 as described above. And, the printer 13 sends the connection mode determination result to the user device 12. Because of this, it can be realized in the same manner as the present embodiment.

Also, in the present embodiment, the connection mode was decided in response to the determination result by using the connection setting information and the history information, but it is not limited to this determination method. For example, any one of the connection setting information and the history information can be used for the determination. Also, the connection mode can be decided from information that indicates the AP currently connected by the user device and without including any connection history. For example, the user device monitors a condition whether or not the user device connects to an AP, and the connection mode can be decided from the detected condition information.

What is claimed is:

1. A wireless communication device that performs a wireless communication with another communication device, comprising:
   a determination part that determines whether the wireless communication device connects to a relay station which performs a wireless relay communication;
   a communication part that performs a wireless communication in a first connection mode to communicate with the other communication device through the relay station in a case that the relay station is connected, and in a case that the relay station is not connected, the communication part that performs a wireless communication in a second connection mode with the other communication device, which does not communicate through the relay station; and
   a temporary communication part that forms temporary communication to perform a temporary wireless communication with the other communication device without connecting to the relay station,
   the temporary wireless communication being different from the wireless communication in the second connection mode and the temporary wireless communication being connected before the wireless communication in the first connection mode or the wireless communication in the second connection mode is connected,
   in a case that the wireless communication is performed in the first connection mode, the communication part connecting to the other communication device through the relay station by sending a connection setting information, which is used to connect to the relay station, to the other communication device through the temporary communication channel,
   in a case that the wireless communication is performed in the second connection mode, the communication part acquiring a direct connection setting information as a connection setting information, which is used to connect to the other communication device, from the other communication device through the temporary communication, and connecting to the other communication device based on the direct connection setting information, and
   the relay station being a wireless access point, the first connection mode being an infrastructure mode, and the second connection mode being a WiFi Direct mode.

2. The wireless communication device according to claim 1, wherein the other communication device is compatible with any one of the infrastructure mode and the WiFi Direct mode.

3. The wireless communication device according to claim 1, wherein the determination part determines whether the wireless communication of the communication part is connected to the relay station based on a connection setting information, which is used to connect to the relay device.

4. The wireless communication device according to claim 1,
   wherein the WiFi Direct mode is a mode for connecting to an access point of the other communication device.

5. The wireless communication device according to claim 1,
   wherein the determination part determines whether the wireless communication device connects to the relay station based on a connection history information indicating a relay station that the communication part has been connected to.

6. The wireless communication device according to claim 1,
   wherein the determination part determines whether the wireless communication device connects to the relay station based on a connection history information indicating a relay station that the communication part has been connected to most recently.

7. A wireless communication system comprising:
   a first communication device and a second communication device so as to perform a wireless communication with each other;
   wherein the first communication device comprises a determination part that determines whether the first wireless communication device connects to a relay station which performs a wireless relay communication,
   a communication part that performs a wireless communication in a first connection mode to communicate with the second communication device through the relay station in a case that the relay station is connected, and in a case that the relay station is not connected, the communication part that performs a wireless communication in a second connection mode with the second communication device, which do not communicate through the relay station, and
   a temporary communication part that forms temporary communication to perform a temporary wireless communication with the other communication device without connecting to the relay station,
   the temporary wireless communication being different from the wireless communication in the second connection mode and the temporary wireless communication being connected before the wireless communication in the first connection mode or the wireless communication in the second connection mode is connected,
   in a case that the wireless communication is performed in the first connection mode, the communication part connecting to the other communication device through the relay station by sending a connection setting information, which is used to connect to the relay station, to the other communication device through the temporary communication channel,
   in a case that the wireless communication is performed in the second connection mode, the communication part acquiring a direct connection setting information as a connection setting information, which is used to connect to the other communication device, from the other communication device through the temporary communication, and connecting to the other communication device based on the direct connection setting information, and
   the relay station being a wireless access point, the first connection mode being an infrastructure mode, and the second connection mode being a WiFi Direct mode.

8. A non-transitory computer-readable medium including a computer program that causes a wireless communication device to perform a wireless communication with another communication device, when the program is executed by a processor of the wireless communication device, operations comprising:

determining whether the wireless communication device connects to a relay station which performs a wireless relay communication;

performing a wireless communication in a first connection mode to communicate with the other communication device through the relay station in a case that the relay station is connected, and performing a wireless communication in a second connection mode with the other communication device, which do not communicate through the relay station; and forming temporary communication to perform a temporary wireless communication with the other communication device without connecting to the relay station, the temporary wireless communication being different from the wireless communication in the second connection mode and the temporary wireless communication being connected before the wireless communication in the first connection mode or the wireless communication in the second connection mode is connected, in a case that the wireless communication is performed in the first connection mode, the communication part connecting to the other communication device through the relay station by sending a connection setting information, which is used to connect to the relay station, to the other communication device through the temporary communication channel, in a case that the wireless communication is performed in the second connection mode, the communication part acquiring a direct connection setting information as a connection setting information, which is used to connect to the other communication device, from the other communication device through the temporary communication, and connecting to the other communication device based on the direct connection setting information, and the relay station being a wireless access point, the first connection mode being an infrastructure mode, and the second connection mode being a WiFi Direct mode.

* * * * *